Nov. 20, 1923.
E. D. TILLYER
1,474,803
TEST LENS
Filed July 8, 1919
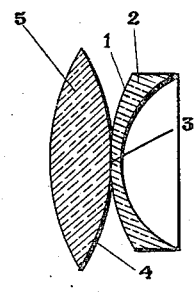
FIG. I
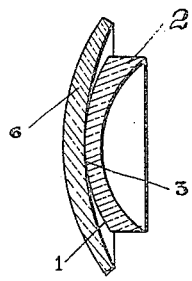
FIG. II
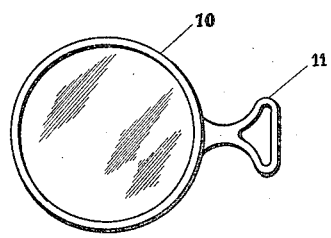
FIG. III
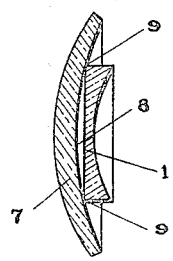
FIG. IV
PRIOR ART
INVENTOR
E.D. TILLYER
BY
H. H. Styll & H. H. Parsons
ATTORNEYS Patented Nov. 20, 1923.

1,474,803

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

TEST LENS.

Application filed July 8, 1919. Serial No. 309,476.

*To all whom it may concern:*

Be it known that I, EDGAR D. TILLYER, a citizen of the United States, residing at Southbridge, in the county of Worcester and State of Massachusetts, have invented certain new and useful Improvements in Test Lenses, of which the following is a specification.

This invention relates to devices for testing the power and accuracy of lenses, particularly of ophthalmic lenses intended for use in correcting the errors of human vision.

The principal object of the invention is to provide a set of testing devices which will neutralize the vertex or effective powers of the various ophthalmic lenses, in order that the actual power of the lenses on the eye of the wearer may be determined.

Another object of the invention is to provide testing lenses so designed that the central or vertex portion of the testing lens may be brought into actual contact with the same position of the lens itself, without any intervening space at this point.

Other objects and advantages of the invention will be readily apparent by reference to the following specification taken in connection with the accompanying drawings, and it will be understood that I may make any modifications in the specific details of construction within the scope of the appended claims without departing from or exceeding the spirit of the invention, the preferred form only being shown and described for sake of illustration.

To facilitate an understanding of the features hereinafter referred to, I have appended a sheet of drawings illustrative of the same. Similar references throughout the specifications and drawings refer to similar parts.

Figure I represents a cross section through an ophthalmic lens and a test lens, the test lens being applied to a convex surface of the ophthalmic lens.

Figure II reperesents a cross section through an ophthalmic lens and a test lens, the test lens being applied to a concave surface of the ophthalmic lens.

Figure III represents a front view of the test lens mounted in a trial lens holder.

Figure IV represents a cross section through an ophthalmic lens and a prior art test lens applied to the concave surface of the ophthalmic lens, the contacting face of the test lens having a longer radius than that of the lens.

Prior to this invention neutralization of ophthalmic lenses has been accomplished by the use of regular trial set lenses. These lenses have been made in one of two forms, either plano on one side and the entire curve on the other, or of double convex or double concave form, the curves necessary to produce the desired power in the trial lens being similar and equal on each side thereof.

To obtain the true effective power of a lens on the eye it is necessary to test or measure the lens at its central or vertex point on the eye side of the lens, and the test lens must contact with the lens at this point. Hitherto with the commercial trial lenses this has been impossible in a large number of instances because the curvature of the lens on the eye side, and the curvature of the contacting side of the trial lens were such that physical contact was impossible. This particularly is true of the better, more scientific form of lenses which are made concavo-convex or disk-like in form, and commonly known as meniscus and toric lenses, the concave side always being next to the eye. It is the object of my invention to make all the neutralizing lenses of such convex curvature on the contact side that all of these lenses which hitherto could not be measured or tested for vertex refraction can now accurately be tested for their vertex refraction as the neutralizing lens is of such shape that it can physically contact on the eye side with the central point of the lens to be tested.

A neutralizing set for vertex refraction or effective power cannot be made in the form in which trial sets or neutralizing sets have hitherto been made, because the center of the neutralizing lens must come in contact with the lens to be neutralized on the surface from which the power is to be measured. In the prior art method of neutralization the trial lens is placed on the first surface (the surface away from the eye) of the lens to be neutralized. On the steeper meniscus and toric lenses this leads to a considerable error as the power which affects the eye must be measured from the side of the lens nearest the eye. This error amounts to more than a diopter for cataract patients who have no power of accommodation to take it up.

It will be understood that a toric surface is one which has different curvatures on the major meridians at ninety degrees apart, and that a meniscus surface is one which has the same curvature in all its meridians.

It will also be understood that the neutralizing system of testing referred to above, is the usual and universal method of testing lenses now in vogue by practically all opticians, optometrists and oculists. It consists in selectively placing test lenses of known power against the lens whose power is to be determined, until the combination of the two produces a no-power combination, or one has neutralized the other. Thus knowing the power of the test lens, the power of the lens is readily obtainable. These test lenses have long been made by the lens manufacturers and supplied usually in sets to those who finish or prescribe the ophthalmic lenses in order that they may check up and test the lenses, or to find the power of unknown lenses.

With the usual prior art sets it has been impossible to place the curve on the eye side in contact with the center or vertex of a meniscus or toric lens because the curvatures prevented actual contact.

In this invention test lenses are provided having such shape and power that they may be placed in contact on the eye side of the regular spectacle and eyeglass lenses and the power so adjusted that when the lenses are neutralized the reading of the neutralizing lens will give the reading of the lens to be measured in effective power or vertex refraction, as it is technically termed.

I arrive at this result by making the curve of the contacting side of the test lens stronger (i. e. of shorter radius) than the lenses in the ophthalmic series in the adjacent power regions of the lens to be tested, and using this as a base determine the curve on the opposite side to give the required power, so that the power measured from the contacting side of the neutralizing lens will be exactly the power which it is desired to use in neutralization.

Referring to the drawing, it will be seen in Figure I, that the contacting face 1 of the neutralizing lens 2 contacts at its central point of vertex 3, with the corresponding point of the convex surface 4 of a biconvex lens 5. It is clear that where both the surfaces 1 and 4 are convex, the two lenses will contact at their centers.

Referring to Figure II, it will be seen also that where the contacting surface 1 of the neutralizing lens is of a stronger curve than the contacting surface 6 of the lens they will contact at the vertex or center points 3, even if the surface of the lens is concave, but if the contacting surface 1 of the neutralizing lens is of a weaker curve (longer radius) than the concave contacting surface of the lens 7, Figure IV, then the two lenses will not contact at their central points; there will be a space 8 between them, as the point of contact will be at the edges 9. Hence it will be impossible to get the true effective power on the eye at the vertex or central point 3.

The neutralizing lenses may be suitably mounted as shown in Figure III, in a frame 10, and also with a suitable handle 11, for manipulation.

My improvement over the prior art is that all of the neutralizing lenses are made with a contacting face of stronger curve than the strongest concave curve of the regular and standard spectacle and eyeglass lenses which they will have to test.

In operation the neutralizing lenses are used precisely like the present neutralizing lenses; that is, placed against the lens that is to be tested, except the contacting base is always brought into contact with the eye side of the lens instead of the opposite side, as is the practice now.

Having described my invention, what I claim is:

1. A neutralizing or test lens for meniscus and toric lenses whose front and rear surfaces are related to give the required power, and whose contacting surface is of stronger curvature than the strongest concave eye side curvature of lenses adjacent the power of the lens to be tested.

2. A series of neutralizing lenses for testing lenses, having one surface concave, the contacting face of which is a sharper convex curve than the concave curve of the lens to be tested, and whose opposite surface is related to the contacting surface to neutralize the vertex or effective power of the lens to be tested when the central points of the lens and test lens are contacted.

3. A series of neutralizing lenses of deep meniscus form having their curves related to depart from the indicated power but to produce correct indicated vertex neutralization as respects a contra-generic lens of equal indicated power.

4. A neutralizing lens for meniscus ophthalmic lenses having a very strong convex curve on one face and a concave curve on the opposite face so related to the convex curve that the fictitious value of the lens will be the actual value of a standard spectacle lens whose effective power is neutralized thereby.

5. A neutralizing lens having its front face formed with a stronger curve than the standard ocular curve for the ophthalmic lens to be neutralized thereby, and having its rear face so related to the front face as to vary the actual effective power of the test lens but produce therein the correct vertex refraction neutralization value as respects a standard optical lens having its vertex in contact therewith.

6. A neutralizing lens for use in connection with meniscus lenses having a strong convex anterior curve and a sharper concave posterior curve whereby a deep concave meniscus form lens is provided whose convex curve will fit into the ocular side of commercial meniscus lenses.

7. A neutralizing lens for use in connection with meniscus lenses having a strong convex anterior curve and a sharper concave posterior curve whereby a deep concave meniscus form lens is provided whose convex curve will fit into the ocular side of commercial meniscus lenses, the sum of the powers of the front and rear surfaces of the neutralizing lens differing from the effective power of the lens to be tested but being related to neutralize the effective power of said lens.

In testimony whereof I have affixed my signature, in presence of two witnesses.

EDGAR D. TILLYER.

Witnesses:
 HARRY H. STYLL,
 H. K. PARSONS.